(12) United States Patent
Kurosawa

(10) Patent No.: US 7,646,976 B2
(45) Date of Patent: Jan. 12, 2010

(54) DIGITAL CAMERA

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 595 days.

(21) Appl. No.: 11/383,550

(22) Filed: May 16, 2006

(65) Prior Publication Data

US 2006/0262659 A1    Nov. 23, 2006

(30) Foreign Application Priority Data

May 17, 2005    (JP) .............................. P2005-143526

(51) Int. Cl.
G03B 3/00  (2006.01)
G03B 7/00  (2006.01)

(52) U.S. Cl. ........................................ 396/213; 396/89
(58) Field of Classification Search .............. 348/222.1, 348/223.1, 225.1, 350; 396/89, 98, 111, 396/121, 213, 225, 231, 233, 236, 275
See application file for complete search history.

(56) References Cited

U.S. PATENT DOCUMENTS

| | | | |
|---|---|---|---|
| 5,266,982 A | 11/1993 | Soshi | |
| 5,808,681 A * | 9/1998 | Kitajima | 348/371 |
| 6,958,773 B1 | 10/2005 | Sato | |
| 2003/0081140 A1* | 5/2003 | Furukawa | 348/362 |
| 2006/0092307 A1* | 5/2006 | Mori et al. | 348/333.01 |

FOREIGN PATENT DOCUMENTS

JP    2003-241064    8/2003

OTHER PUBLICATIONS

English language Abstract of JP 2003-241064.

* cited by examiner

Primary Examiner—Rodney E Fuller
(74) Attorney, Agent, or Firm—Greenblum & Bernstein P.L.C.

(57) ABSTRACT

A digital camera includes an imaging device for capturing images of an object, a signal processor which performs signal processing on a signal captured by the imaging device to obtain an image signal, and a single measuring device for measuring color of at least a part of the object, and for measuring a color temperature of the object to adjust white balance of the image signal.

18 Claims, 7 Drawing Sheets

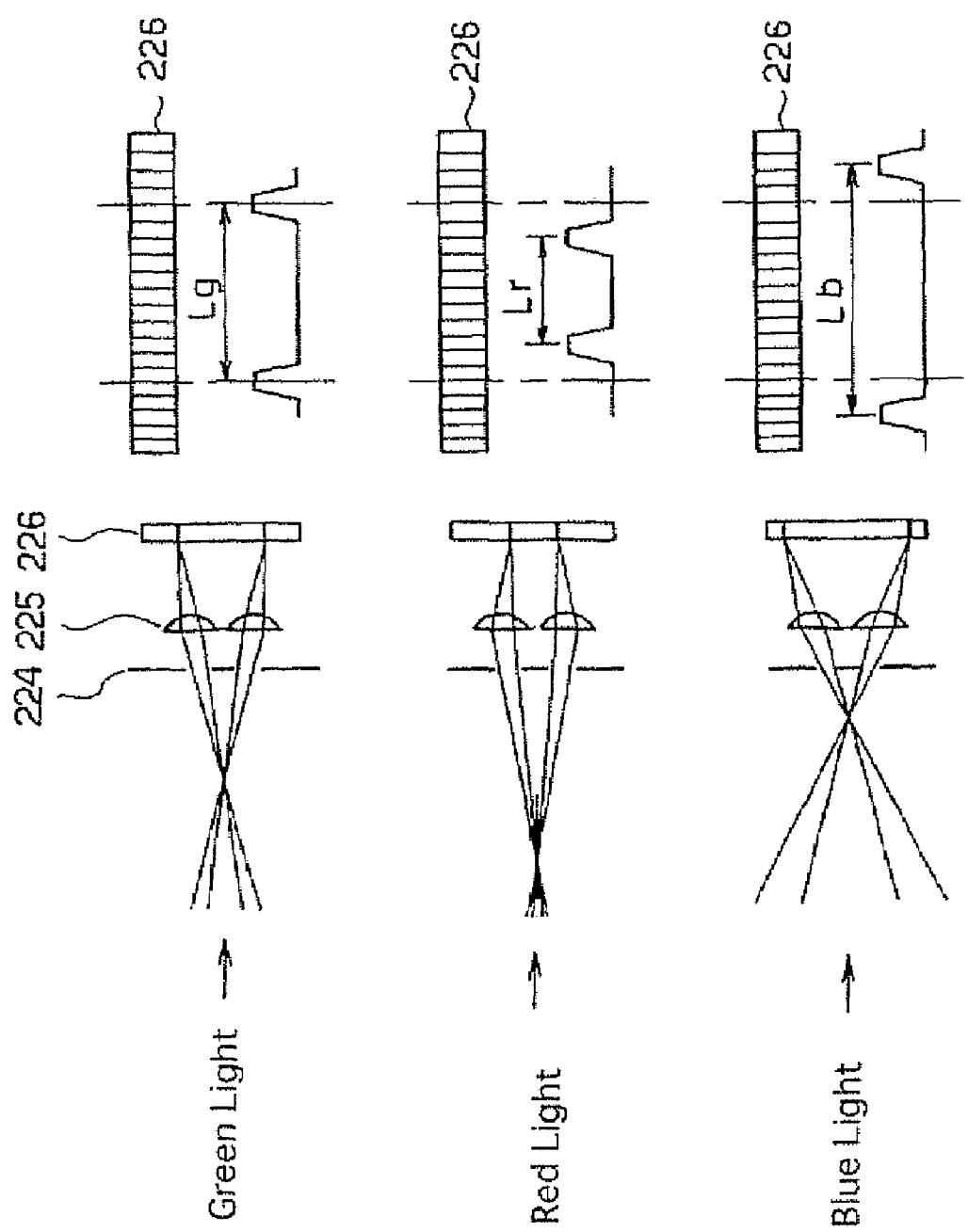

DIGITAL CAMERA

BACKGROUND OF THE INVENTION

1. Field of the Invention

The present invention relates to a digital camera, more specifically relates to an AF (autofocus) digital camera capable of taking color images.

2. Description of the Prior Art

In AF digital cameras, a part of the light bundle of an object which is formed through a photographing lens is lead to an AF sensor unit to measure an object distance (defocus amount) at the AF sensor unit. FIGS. 7A, 7B and 7C are diagrams illustrating the principle of operation of such an AF sensor unit which is incorporated in an SLR type of digital camera. Each of these diagrams shows a state of the aforementioned part of the light bundle of an object, which is formed through a photographing lens, in the AF sensor unit, and further shows the distance (image-to-image distance) between two separate images received by an AF sensor 226 thereon (between two peaks of a signal output from the AF sensor). The above-mentioned part of the light bundle of an object, which is formed through a photographing lens, is separated into two light bundles by an aperture mask 224 having two apertures, which are in turn focused on the AF sensor 226 via two separator lenses 225, respectively. The AF sensor 226 is a line sensor, or the like, and measures the distance between two images of the two light bundles focused on the AF sensor 226. Thereafter, an in-focus state is achieved by driving a focusing lens system (focusing lens group) of the photographing lens by feedback control performed by an AF controller (focusing device (not shown)) so that the aforementioned image-to-image distance becomes a predetermined distance.

In this type of AF sensor unit, the effective focal length of the optical system of the AF sensor unit varies depending on differences in color of light of an object, i.e., differences in wavelength of light incident on the AF sensor unit, and therefore, the imaging position in the AF sensor 226 varies depending on wavelengths of the received light, which makes it impossible for the aforementioned focusing lens system of the photographing lens to obtain a correct in-focus state, i.e., which becomes a cause of an AF error. For instance, if the image-to-image distance Lg at the AF sensor 226 upon receiving green light is regarded as a reference distance (see FIG. 7A), the effective focal length of the optical system of the AF sensor unit increases as shown in FIG. 7B when the AF sensor unit 226 receives red light (long-wavelength light), and accordingly, the image-to-image distance Lr at the AF sensor 226 upon receiving red light becomes shorter than the reference distance, and the effective focal length of the optical system of the AF sensor unit decreases as shown in FIG. 7C upon the AF sensor unit 226 receiving blue light (short-wavelength light), and accordingly, the image-to-image distance Lb at the AF sensor 226 upon receiving blue light becomes longer than the reference distance. Note that the optical path difference of a light bundle of an object due to the difference of light wavelength is exaggerated in FIGS. 7A, 7B and 7C for the purpose of illustration. Such variations of the image-to-image distance that depend on wavelengths of the received light cause variations in measured distance value, thus becoming a cause of an AF error.

To overcome this problem of AF error, a technique of eliminating AF error such as noted above, which is caused by color difference in light of an object the object distance of which is to be measured, by measuring color of the object light and correcting the output of the AF sensor unit (i.e., a measured object distance value or an in-focus position) in accordance with the measured color has been proposed in Japanese unexamined patent publication 2003-241064. In this publication, the photometric sensor is provided on a part of the light receptive surface with an optical filter so that the photometric sensor measures the object color by receiving light which is passed through the optical filter. In order to correct the AF error in an effective manner, colorimetric (color measuring) elements are disposed to carry out color measurements at positions corresponding to distance measuring points on an object which is to be photographed, i.e., at positions corresponding to points on object images which are formed on an AF sensor via separator lenses in the AF sensor unit.

In the technique shown in the aforementioned publication, since the photometric sensor is constructed so that the color measurements are performed with a part of the light receptive surface of the photometric sensor, it can be said that the photometric sensor and a calorimetric sensor (which includes the aforementioned colorimetric elements) are formed integral with each other, and accordingly, it is considered that the color measurements may exert an influence upon a photometering operation.

More specifically, in the technique shown in the aforementioned publication, the photometric sensor measures the intensity of visible light over all wavelengths thereof, whereas the colorimetric sensor measures the intensities of red, green and blue lights by a plurality of photoreceivers of the calorimetric sensor which include spectroscopic color filters for red, green and blue lights. Since the colorimetric sensor performs color measurements for distance measuring points on an object to exercise AF control in the AF sensor unit such as the aforementioned feedback control, the calorimetric sensor influences the photometric values measured at the distance measuring points. Namely, when taking a picture with a camera, it is generally the case that the object distance is measured to bring a portion of the object which is to be photographed into focus; however, if the photometric value measured at this portion of the object is influenced by the operation of the colorimetric sensor, this results in the colorimetric sensor influencing the correct exposure at object. A solution to this problem is to separate the photometric sensor and the calorimetric sensor from each other; however, this inevitably requires two sensors. Specifically, in the case where the aforementioned type of photometric and calorimetric techniques is applied to a digital camera, it is necessary for the digital camera to be provided with a color temperature sensor (white balance sensor) for determining a standard of reference used for photographing white light as a true white, which requires not only a photometric sensor and a calorimetric sensor but also a color temperature sensor, i.e., three sensors in total. This increase in number of sensors complicates the overall structure of the digital camera.

SUMMARY OF THE INVENTION

The present invention provides an AF digital camera, capable of taking color images, which includes a color temperature sensor, a photometric sensor and a colorimetric sensor, wherein the structure of the digital camera is simplified by a reduction in the number of sensors included in the digital camera.

According to an aspect of the present invention, a digital camera is provided, including an imaging device for capturing images of an object; a signal processor which performs signal processing on a signal captured by the imaging device to obtain an image signal; and a single measuring device for measuring color of at least a part of the object, and for measuring a color temperature of the object to adjust white balance of the image signal.

It is desirable for the digital camera to include an AF controller which measures an object distance of the object and performs AF control on operation of a focusing lens system of a photographing lens to bring the object into focus automatically; and a controller which makes an adjustment to the AF control based on the color of the object that is measured by the single measuring device.

It is desirable for the digital camera to include a white balance adjustment device, wherein the white balance adjustment device adjusts a white balance of the image signal captured by the imaging device in accordance with the measured object color temperature of the object.

It is desirable for the digital camera to include a look-up table from which the controller obtains a correction value used for the adjustment to the AF control based on the color of the object that is measured by the single measuring device.

It is desirable for the AF controller to be configured to measure an object distance at least one predetermined point on the object, and for the single measuring device to be configured so that a photoreceptive area thereof measures color of the object at the predetermined point on the object.

It is desirable for the single measuring device to include a photoreceptor, a light receptive surface of which is sectioned into a plurality of light receptive areas; and an optical plate positioned in front of the photoreceptor. A portion of the plurality of light receptive areas is configured to measure the color of the object and the remaining portion of the plurality of light receptive areas is configured to measure the color temperature of the object. A portion of the optical plate which corresponds to the portion of the plurality of light receptive areas is formed as a transparent portion which allows light of the object to pass therethrough. A portion of the optical plate which corresponds to the remaining portion of the plurality of light receptive areas is formed as a diffusing portion which diffuses light of the object which is incident thereon.

It is desirable for the single measuring device to include at least one color filter, fixed to cover the plurality of light receptive areas, for having each the plurality of light receptive areas receive light of the object spectroscopically.

It is desirable for each of a plurality of portions of the color filter which respectively correspond to the plurality of light receptive areas to include at least one red-light filter portion, at least one green-light filter portion and at least one blue-light filter portion.

It is desirable for the single measuring device to be configured so that the photoreceptive area and the transparent portion are arranged to correspond to at least one specific point in the AF controller.

It is desirable for the digital camera to include a photometer adapted for exposure settings for capturing images with the imaging device, wherein the photometer is independent of the single measuring device.

It is desirable for the photographing lens to be an interchangeable lens.

It is desirable for the digital camera to include an SLR digital camera having an image-erecting optical system, the single measuring device being positioned in a vicinity of an exit surface of the image-erecting optical system so that a portion of light which exits out of the exit surface is incident on the single measuring device.

It is desirable for the AF controller to include an AF sensor unit and an AF driving mechanism including a motor which drives the focusing lens system.

According to the present invention, a single measuring device is configured to be capable of performing not only color measurements but also color temperature measurements. Therefore, even if the camera is provided with a photometer independently of the single measuring device, the camera only needs to be provided with two measuring devices, which simplifies the structure of the digital camera. Moreover, since the photometer can be provided independently of the single measuring device, an influence upon a photometering operation of the photometer which is caused by a color filter used in performing object color measurements can be eliminated, which makes both accurate photometric measurements and picture taking with correct exposure possible. Furthermore, since the single measuring device can carry out color measurements on at least one predetermined point on an object at which the object distance is measured, a high-precision AF control is achieved. Furthermore, since the single measuring device can carry out color measurements and color temperature measurements at the same time, an appropriate color temperature adjustment (white balance adjustment) can be made when photographing color images.

The present disclosure relates to subject matter contained in Japanese Patent Application No. 2005-143526 (filed on May 17, 2005) which is expressly incorporated herein in its entirety.

BRIEF DESCRIPTION OF THE DRAWINGS

The present invention will be discussed below in detail with reference to the accompanying drawings, in which:

FIGS. 7A, 7B and 7C are diagrams showing the principle of distance measuring operation with an AF sensor unit.

DESCRIPTION OF THE PREFERRED EMBODIMENT

Figure 1:
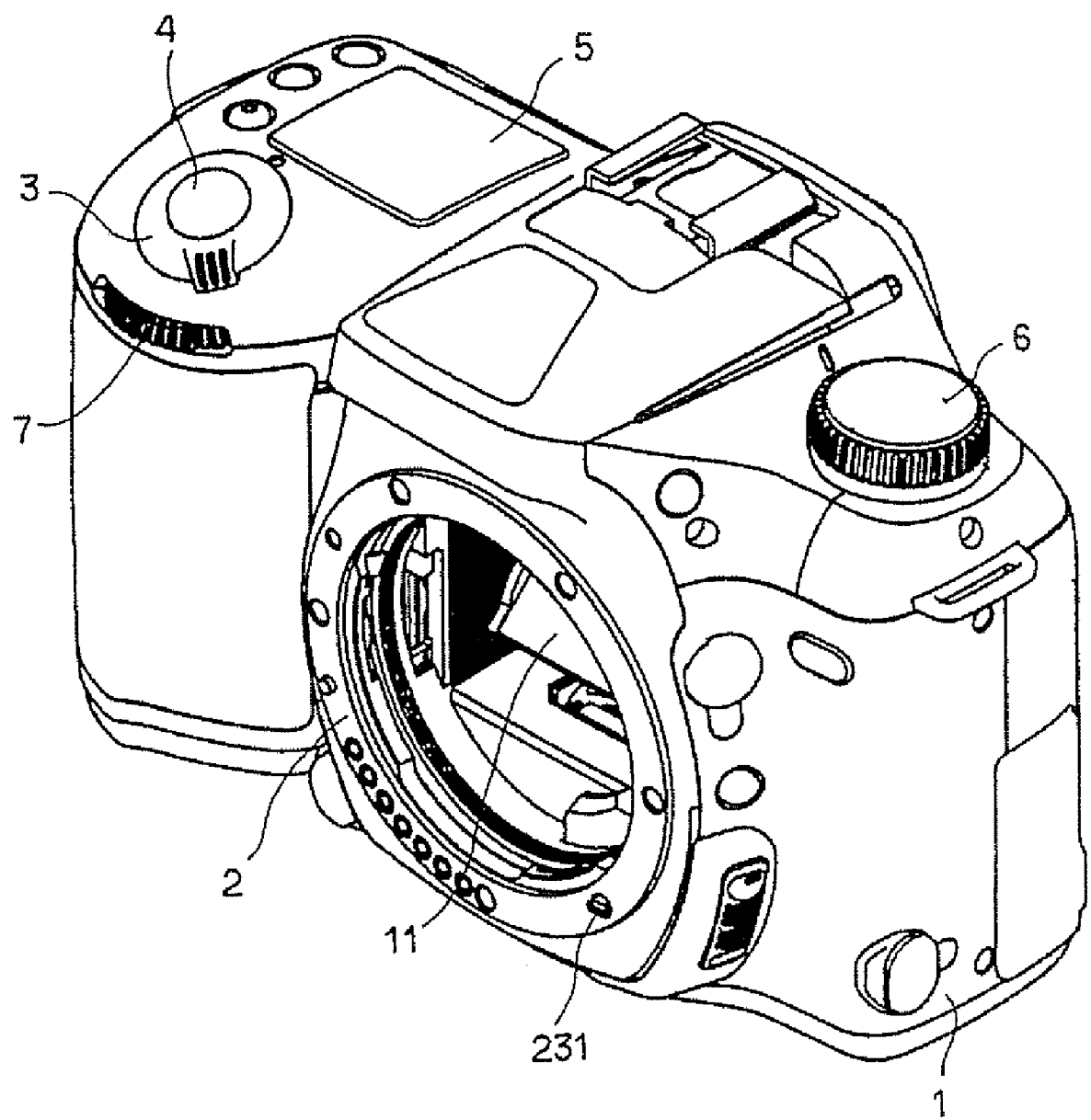
FIG. 1 is perspective view of an embodiment of a digital camera according to the present invention, viewed obliquely from front of the camera.

An embodiment of a digital camera shown in FIG. 1 is constructed as an SLR digital camera using an interchangeable photographing lens 8 (schematically shown in FIG. 5) which is detachably attached to the front of a camera body 1. The camera body 1 is provided on a front wall thereof with a lens mount 2 to which the photographing lens 8 is dismountably mounted. The digital camera is provided on top of the camera body 1 with a rotary main switch 3, a release button 4, around which the rotary main switch 3 is positioned, an LCD (liquid crystal display) indicator portion 5 for indicating various photographic information, and a mode select dial (dial switch) 6 for selecting a desired photographic mode from among various photographic modes. A photometering operation and a shutter release operation are performed upon the release button 4 being half and fully depressed, respectively. Namely, the release button 4 serves as not only a release switch for releasing a focal plate shutter 18 (see FIG. 5) but also as a photometering switch for performing a photometering operation. The digital camera is provided in front of the main switch 3 with a front function dial 7 which is operated for exposure adjustment. A front end of an AF coupler 231, which is driven by an AF motor 232 (see FIG. 2) to move a focusing lens system (e.g., a focusing lens group; not shown) of the photographing lens 8 to bring an object into focus, projects forward from a front surface of the lens mount 2. Upon the photographing lens 8 being mounted to the lens mount 2, the AF coupler 231 is coupled to an AF driving mechanism 23 (see FIG. 5) for driving the focusing lens system.

Figure 2:
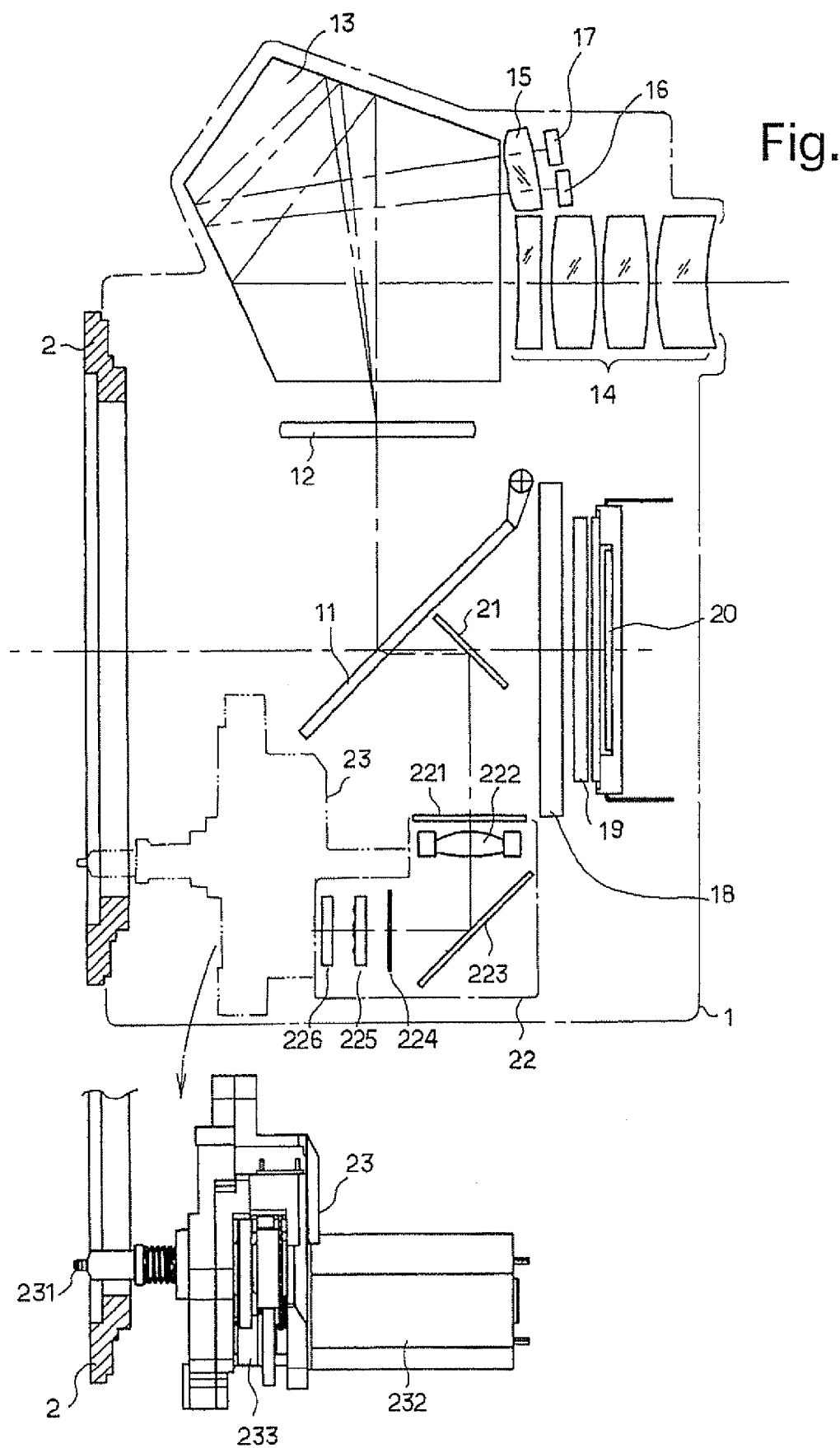
FIG. 2 is a diagram showing the internal structure of the digital camera shown in FIG. 1.

FIG. 2 shows the internal structure of the digital camera shown in FIG. 1 in cross section. Light of an object which is focused through the photographing lens 8 mounted to the lens mount 2 is reflected upwards by a swingable half mirror (quick-return mirror) 11 to be incident on a focusing screen 12 to be formed as an object image thereon. The light of this object image focused on the focusing screen 12 enters a pentagonal prism (image-erecting optical system) 13, is subsequently reflected more than once by inner surfaces of the pentagonal prism 13, and exits out of the pentagonal prism 13 to be viewed by the photographer as an erect image through an eyepiece system 14. The light of the object image which enters the pentagonal prism 13 to exit therefrom partly enters a twin condenser lens 15 positioned behind the pentagonal prism 13, to be converged by the condenser lens 15 to two points at which a colorimetric sensor (single measuring device/dual-purpose measuring device) 17 and a photometric sensor (photometer) 16 are disposed so that photometric measurements and color measurements are carried out by the photometric sensor 16 and the calorimetric sensor 17, respectively.

The focal plane shutter 18 is positioned behind the swingable half mirror 11. An optical low-pass filter 19 and a CCD image sensor 20 are positioned behind the focal plane shutter 18. Upon the release button 4 being fully depressed, the swingable half mirror 11 is lifted up while the focal plane shutter 18 is opened. Thereupon, the CCD image sensor 20 captures the object image focused thereon via the photographing lens 8. The CCD image sensor 20 is a color image sensor capable of taking color images. The object light which is passed through the swingable half mirror 11 is partly incident on a secondary mirror 21, which is pivoted at a rear surface of the swingable half mirror 11, to be reflected downwards to be incident on an AF sensor unit 22 so that an object distance measuring operation is performed. Thereupon, based on the distance measurement data obtained via the AF sensor unit 22, the AF driving mechanism 23 is actuated to move the focusing lens system of the photographing lens 8 to perform a focusing operation (autofocusing operation). As shown in FIG. 2, the AF driving mechanism 23 includes the AF motor 232 for rotating the AF coupler 231 and a transmission 233. The focusing lens system of the photographing lens 8 mounted to the lens mount 2 is coupled to the AF driving mechanism 23 so that the AF driving mechanism 23 can drive the focusing lens system to perform a focusing operation by rotating the AF coupler 231.

Figure 3:
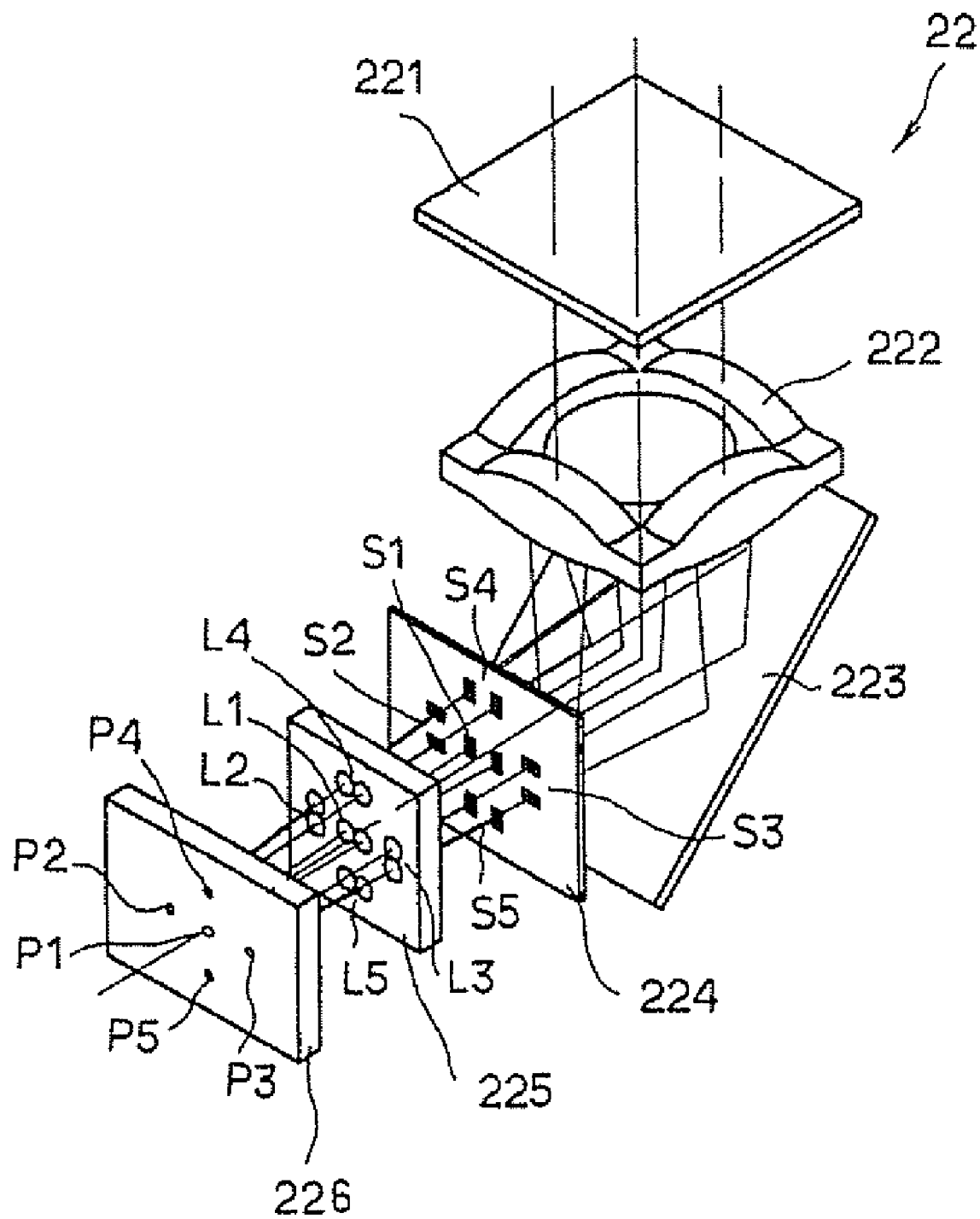
FIG. 3 is a perspective view of optical elements of an AF sensor unit shown in FIG. 2, schematically showing the structure of the AF sensor unit.

As shown schematically in FIG. 3, the AF sensor unit 22 includes an IR (infrared) cutoff filter 221, a condenser lens 222, a mirror 223, an aperture mask 224, a separator lens 225 and an AF sensor 226. As described above, the object light which is passed through the swingable half mirror 11 and reflected downwards by the secondary mirror 21 is incident on the IR cutoff filter 221 so that infrared components are filtered out from the incident light. Subsequently, the light which is passed through the IR cutoff filter 221 is converged via the condenser lens 222, and the converged light is reflected by the mirror 223 to be incident on first through fifth pairs of minute apertures S1, S2, S3, S4 and S5 formed on the aperture mask 224 to be selectively allowed to pass through the aperture mask 224 to be formed as five pairs of fine bundles of light. The separator lens 225 is provided with five pairs of separator lenses L1, L2, L3, L4 and L5 which are formed at positions corresponding to the five pairs of minute apertures S1, S2, S3, S4 and S5, respectively. The five pairs of minute bundles of light which are respectively passed through the five pairs of minute apertures S1 through S5 of the aperture mask 224, are subsequently passed through the five pairs of separator lenses L1 through L5 of the separator lens 225 so as to be formed as five pairs of images on the AF sensor 226, respectively. In the present embodiment of the digital camera, the five pairs of minute apertures S1 through S5 of the aperture mask 224 and the five pairs of separator lenses L1 through L5 of the separator lens 225 are arranged to correspond to five points in a rectangular picture plane: a central point and the remaining four points (upper, lower, left and right points) around the central point. The object distance (defocus amount) is measured by measuring each of the five distances (image-to-image distances) between each of the five pairs of separate images formed on the AF sensor 226 via the five pairs of separator lenses L1 through L5 of the separator lens 225, respectively. Accordingly, five points on the AF sensor 226 which respectively correspond to the aforementioned five points (the central, upper, lower, left and right points) serve as distance measuring points P1, P2, P3, P4 and P5 in the AF sensor unit 22, respectively.

Figure 4A:
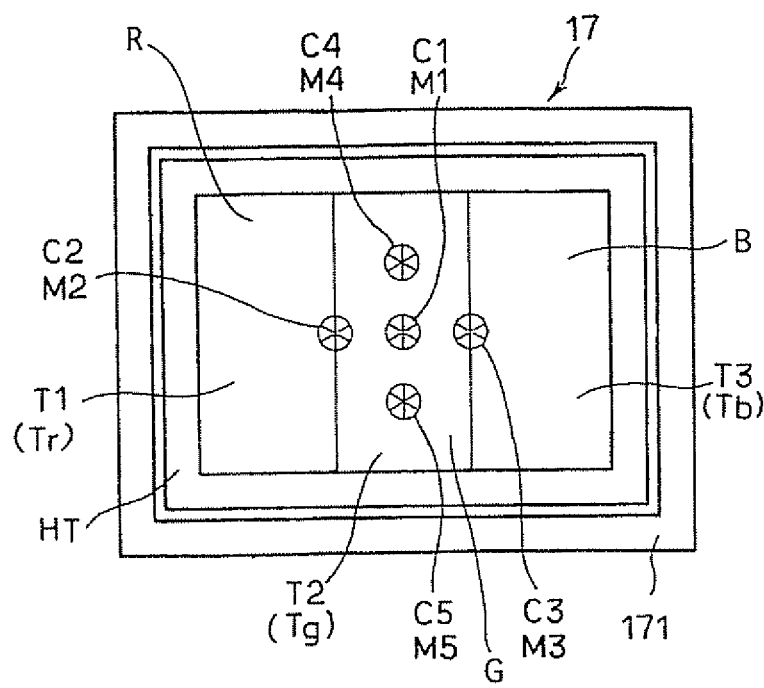
FIG. 4A is a front elevational view of a colorimetric sensor of the digital camera shown in FIG. 2.
Figure 4B:
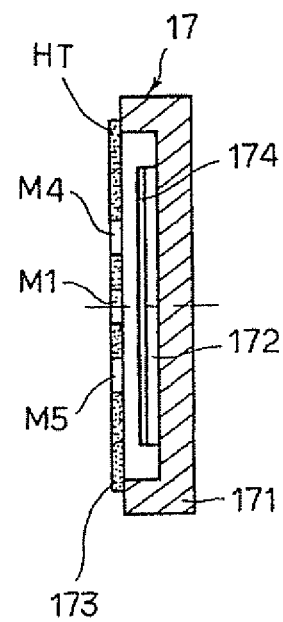
FIG. 4B is a cross sectional view of the calorimetric sensor shown in FIG. 4A.
Figure 4C:
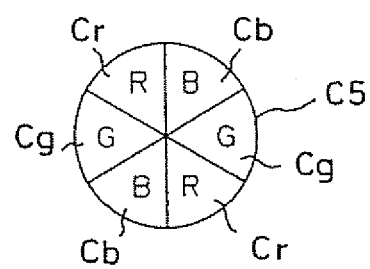
FIG. 4C is a circular color measuring area of the calorimetric sensor shown in FIG. 4A.

The photometric sensor 16 is made up of a photoreceptor such as a photodiode, the light receptive surface of which is formed in a single flat surface, and is made as a single sensor independent of the calorimetric sensor 17. A conventional photometric sensor is used as the photometric sensor 16 with no modification, and accordingly, the detailed description of the photometric sensor 16 is omitted. On the other hand, the calorimetric sensor 17 can carry out color measurements and color temperature measurements at the same time. Namely, the calorimetric sensor 17 is configured to also serve as a color temperature sensor (white balance adjustment device). FIGS. 4A and 4B show a front elevational view and a cross sectional view of the calorimetric sensor 17, respectively, and FIG. 4C shows a circular color measuring area (C1 through C5) of the calorimetric sensor 17. The colorimetric sensor 17 includes a base 171, a flat photoreceptor 172, an optical plate 173 and a color filter 174. The base 171 is in the shape of a rectangular tray. The photoreceptor 172 is made of, e.g., a flat photodiode. The photoreceptor 172 is fixed to an inner surface of the base 171 to be positioned therein. The optical plate 173 is fixed to a front end surface of the front edge of the base 171 to cover the photoreceptor 172. The calorimetric sensor 17 receives light which is passed through the optical plate 173 on the photoreceptor 172 to carry out color measurements and color temperature measurements. The optical plate 173 is provided at five points thereon with five circular transparent portions: a central transparent portion M1 and four transparent portions (an upper transparent portion M2, a lower transparent portion M3, a left transparent portion M4 and a right transparent portion M5) positioned around the central transparent portions M1. The portion of the optical plate 173 excluding the five circular transparent portions M1 through M5 is formed as a translucent white portion HT which diffuses incident light. The five circular transparent portions M1 through M5 are arranged in a rectangular picture plane at positions corresponding to the aforementioned distance measuring points P1, P2, P3, P4 and P5 of the AF sensor unit 22, respectively.

The light receptive surface of the flat photoreceptor 172 is sectioned into eight areas: five circular color measuring areas C1, C2, C3, C4 and C5 and three color temperature measuring areas T1, T2 and T3. The five circular color measuring areas C1 through C5 are arranged to correspond to the five circular transparent portions M1 through M5, respectively, while the entire area of the light receptive surface of the flat photoreceptor 172 is horizontally sectioned into substantially equal three areas to form the three color temperature measuring areas T1 through T3, respectively. Additionally, each of the five circular color measuring areas C1 through C5 is circumferentially sectioned into six equal sector areas about the center of the circular color measuring area: two red-light receptive areas Cr, two blue-light receptive areas Cb and two green-light receptive areas Cg as shown in FIG. 4B. The two red-light receptive areas Cr are positioned radially opposed to each other. Likewise, the two blue-light receptive areas Cb are positioned radially opposed to each other, and the two green-light receptive areas Cg are positioned radially opposed to each other. The three color temperature measuring areas T1, T2 and T3 serve as a red-light receptive area Tr, a green-light receptive area Tg and a blue-light receptive area Tb, respectively. The light receptive surface of the photoreceptor 172 is covered with the color filter 174. Portions of the color filter 174 which cover the two red-light receptive areas Cr, the two blue-light receptive areas Cb and the two green-light receptive areas Cg of each of the five circular color measuring areas C1 through C5 are formed as two red-light micro filters R, two blue-light micro filters B and two green-light micro filters G, respectively. Portions of the color filter 174 which cover the three color temperature measuring areas T1 through T3 are formed as a red-light micro filter R, a blue-light micro filter B and a green-light micro filter G, respectively. The color filter 174 can be formed on the photoreceptor 172 via semiconductor manufacturing technology (e.g., color filter manufacturing technology in manufacturing CCD image sensors) at the same time as the photoreceptor 172 is produced. The photoreceptor 172 outputs independent color signals for each of the red-light receptive areas Cr, the blue-light receptive areas Cb and the green-light receptive areas Cg from each of the five circular color measuring areas C1, C2, C3, C4 and C5, and outputs independent color-temperature signals for each of the three color temperature measuring areas T1, T2 and T3.

Figure 5:
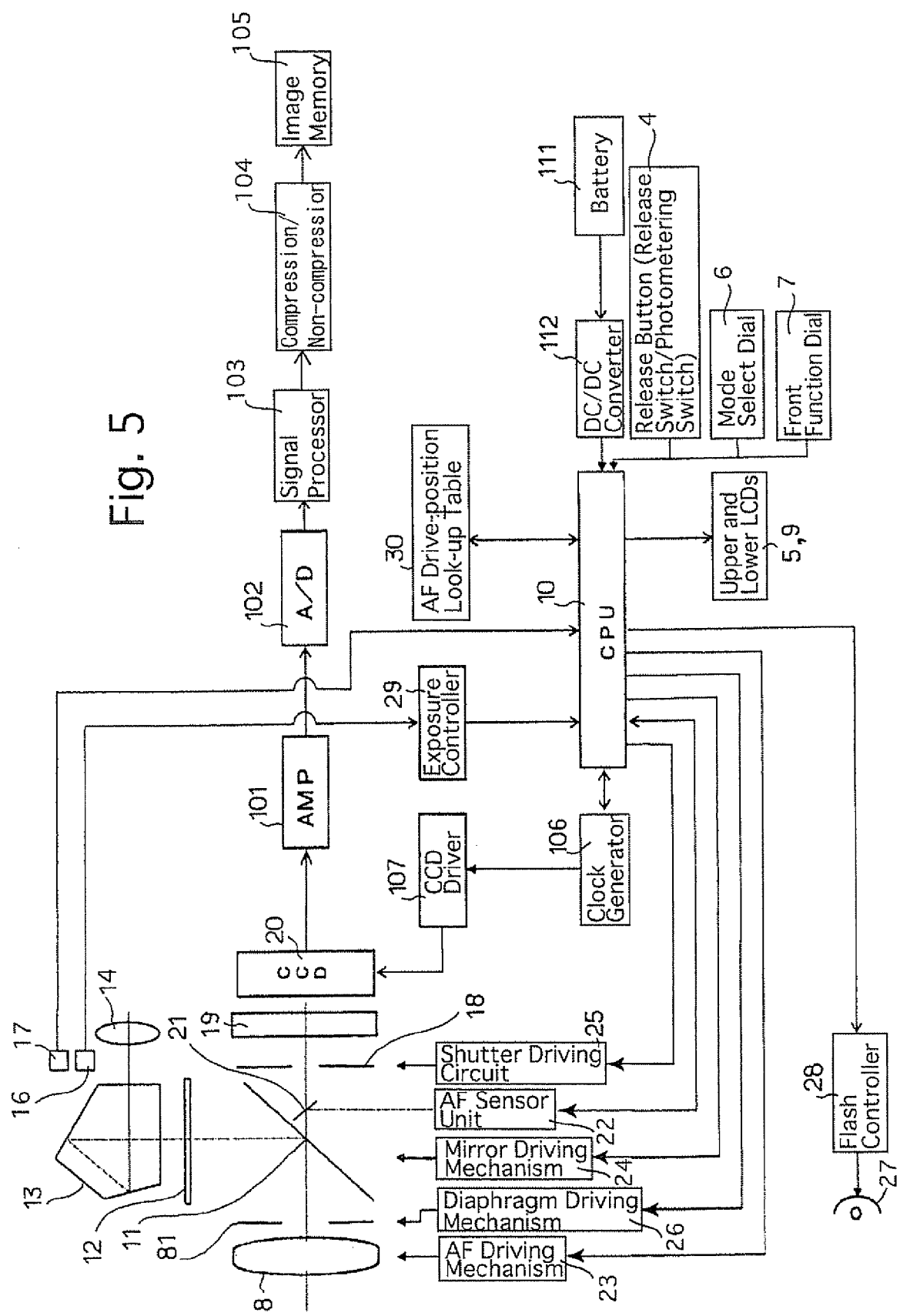
FIG. 5 is a diagrammatic representation of various components of the digital camera shown in FIG. 1.

FIG. 5 shows a diagrammatic representation of the various components of the digital camera. An image signal (which includes a red-image signal, a blue-image signal and a green-image signal) output from the CCD image sensor 20 is amplified by an amplifier (AMP) 101, and subsequently converted into a digital image signal by an A/D converter 102. This digital image signal is subjected to predetermined signal processes such as color processing and gamma correction processing by a signal processing circuit 103 to be output as a required form of signal. Subsequently, this processed signal is either compressed or not compressed via a compressing/non-compressing circuit 104 to be stored in a VRAM (image memory) 105. The CCD image sensor 20 can set a charge accumulation time for the CCD image sensor 20 at a time of exposure by controlling the operation of a CCD driver 107 via a clock generator 106 by a CPU 10. The CPU 10 comprehensively controls the overall operation of the digital camera.

The CPU 10 uses the output from a DC-DC converter 112, which DC-DC-converts power from the battery 111, as a power source. In a photographing operation, the CPU 10 commands the AF sensor unit 22 to perform a distance measuring operation and controls the operation of the AF driving mechanism 23. The CPU 10, the sensor unit 22 and the AF driving mechanism 23 constitute an AF controller. Additionally, the CPU 10 controls the operation of a mirror driving mechanism 24 (not shown in FIG. 2) to move the swingable half mirror 11, and further controls the operation of a shutter driving circuit 25 to control opening/closing operations of the focal plane shutter 18. At the same time, the CPU 10 controls the operation of a diaphragm 81 provided in the photographing lens 8 via a diaphragm driving mechanism 26. Furthermore, the CPU 10 operates so that both the LCD indicator portion 5 and a back LCD indicator portion 9 (see FIG. 5; not shown in FIG. 1) indicate necessary data. The back LCD indicator portion 9 is provided on the back of the camera body 1, and is capable of indicating captured object images and various information. The CPU 10 controls the operation of a flash control circuit 28 to bring a flash 27 into operation if necessary.

Exposure information calculated by an exposure controller 29 in accordance with a photometric value obtained by the photometric sensor 16 is input to the CPU 10. Moreover, object color information and color temperature information which are measured by the colorimetric sensor 17 are input to the CPU 10. An AF-drive-position look-up table 30 is connected to the CPU 10. The digital camera is provided with the AF-drive-position look-up table 30 so that the CPU 10 gains a correction value for correcting an in-focus position of the focusing lens system of the photographing lens 8 when the CPU 10 performs an AF control process in accordance with object color measured by the colorimetric sensor 17. In the AF-drive-position look-up table 30, correlation data on the correlation between object colors and correction values for making a correction to distance measurement data, which is obtained via the AF sensor unit 22, in association with the object colors are written in advance. For instance, with the use of object distance data which is obtained in the case where the object color measured by the colorimetric sensor 17 is green as reference object distance data, correction values for correcting (revising) this reference object distance data toward plus or minus direction if the object color is red or blue, respectively. The correlation data which correlates such correction values with object colors have been recorded in the AF-drive-position look-up table 30.

ON-OFF information on the photometering switch and the release switch of the release button 4 and photographic mode information set by an operation of the mode select dial 6 are input to the CPU 10. In addition, information on the position of the front function dial 7 (i.e., photographic mode information) when the front function dial 7 is operated is input to the CPU 10.

In the digital camera having the above described structure, light of an object to be formed as an object image via the photographing lens 8 partly passes through the swingable half mirror 11 and is subsequently reflected by the second mirror 21 to be incident on the AF sensor unit 22. In the AF sensor unit 22, the incident light is converged by the condenser lens 222 and subsequently reflected by the mirror 233 to be formed as five pairs of fine bundles of light via the first through fifth pairs of minute apertures S1 through S5 of the aperture mask 224. Subsequently, these five pairs of fine bundles of light are formed as five pairs of separate images on the AF sensor 226 via the five pairs of separator lenses L1, L2, L3, L4 and L5, respectively. As described above with reference to FIG. 7, the five distances (image-to-image distances) between five pairs of separate images formed on the AP sensor 226 via the five pairs of separator lenses L1 through L5 of the separator lens 225 are measured, respectively, and from these five distance values an object distance is determined on each of the five distance measuring points P1, P2, P3, P4 and P5 in the AF sensor unit 22. Distance measurement data on these five object distances are input to the CPU 10, and then the CPU 10 performs a predetermined distance measuring process based on the input distance measurement data to gain an object distance.

On the other hand, a part of the object light which is passed through the photographing lens 8 is reflected by the swingable half mirror 11, focused on the focusing screen 12 and is thereafter incident on the photometric sensor 16 and the calorimetric sensor 17 via the pentagonal prism 13. The photometric sensor 16 outputs a photometric signal corresponding to the amount of light received to the exposure controller 29. The exposure controller 29 determines the object brightness from the photometric signal input from the photometric sensor 16, calculates a correct exposure value and outputs this correct exposure value to the CPU 10. Due to these operations, the CPU 10 sets a shutter speed (time value) for the focal plane shutter 18 and an aperture value for the diaphragm 81 of the photographing lens 8.

Concurrently with this operation of the CPU 10, the calorimetric sensor 17 measures the object color and the object color temperature at the same time. Namely, among the rays of object light incident on the optical plate 173, rays of light which are passed through the five transparent portions M1 through M5 of the optical plate 173 are incident on the five circular color measuring areas C1, C2, C3, C4 and C5 of the photoreceptor 172, respectively. In each of the five circular color measuring areas C1, C2, C3, C4 and C5 rays of object light incident on the circular color measuring area pass through the associated two red-light micro filters R, the associated two blue-light micro filters B and the associated two green-light micro filters G of the color filter 174, which cover the two red-light receptive areas Cr, the two blue-light receptive areas Cb and the two green-light receptive areas Cg of the circular color measuring area, to be received by the two red-light receptive areas Cr, the two blue-light receptive areas Cb and the two green-light receptive areas Cg of the circular color measuring area, respectively. The CPU 10 can perform color measurements on each of the five circular color measuring areas C1, C2, C3, C4 and C5 by inputting a photometric signal output from each of these six receptive areas Cr, Cb and Cg of each of the five circular color measuring areas C1, C2, C3, C4 and C5 and performing a predetermined colorimetric operation. This calorimetric operation is known in the art, and accordingly the detailed description thereof is omitted.

At the same time, among the rays of object light incident on the optical plate 173, rays of light which are incident on the translucent white portion HT and passed therethrough are diffused by the translucent white portion HT, are incident on the three color temperature measuring areas T1, T2 and T3 of the photoreceptor 172, i.e., the red-light receptive area Tr, the green-light receptive area Tg and the blue-light receptive area Tb. At this time, since the incident object light is diffused, the light in the entire picture plane is incident uniformly on the red-light receptive area Tr (the color temperature measuring area T1), the green-light receptive area Tg (the color temperature measuring area T2) and the blue-light receptive area Tb (the color temperature measuring area T3). In each of the red-light receptive area Tr, the green-light receptive area Tg and the blue-light receptive area Tb, rays of object light incident thereon pass through the red-light micro filter R, the green-light micro filter G and the blue-light micro filter B that cover the three color temperature measuring areas T1 through T3, respectively, and a photoreceptive signal obtained from each of the red-light receptive area Tr, the green-light receptive area Tg and the blue-light receptive area Tb is input to the CPU 10. The CPU 10 can measure a color temperature of an object by performing a predetermined operation (color temperature measuring operation) in accordance with photometric information obtained from the red-light receptive area Tr, the green-light receptive area Tg and the blue-light receptive area Tb. Such a color temperature measuring operation is known in the art, and accordingly a detailed description thereof is omitted.

Figure 6:
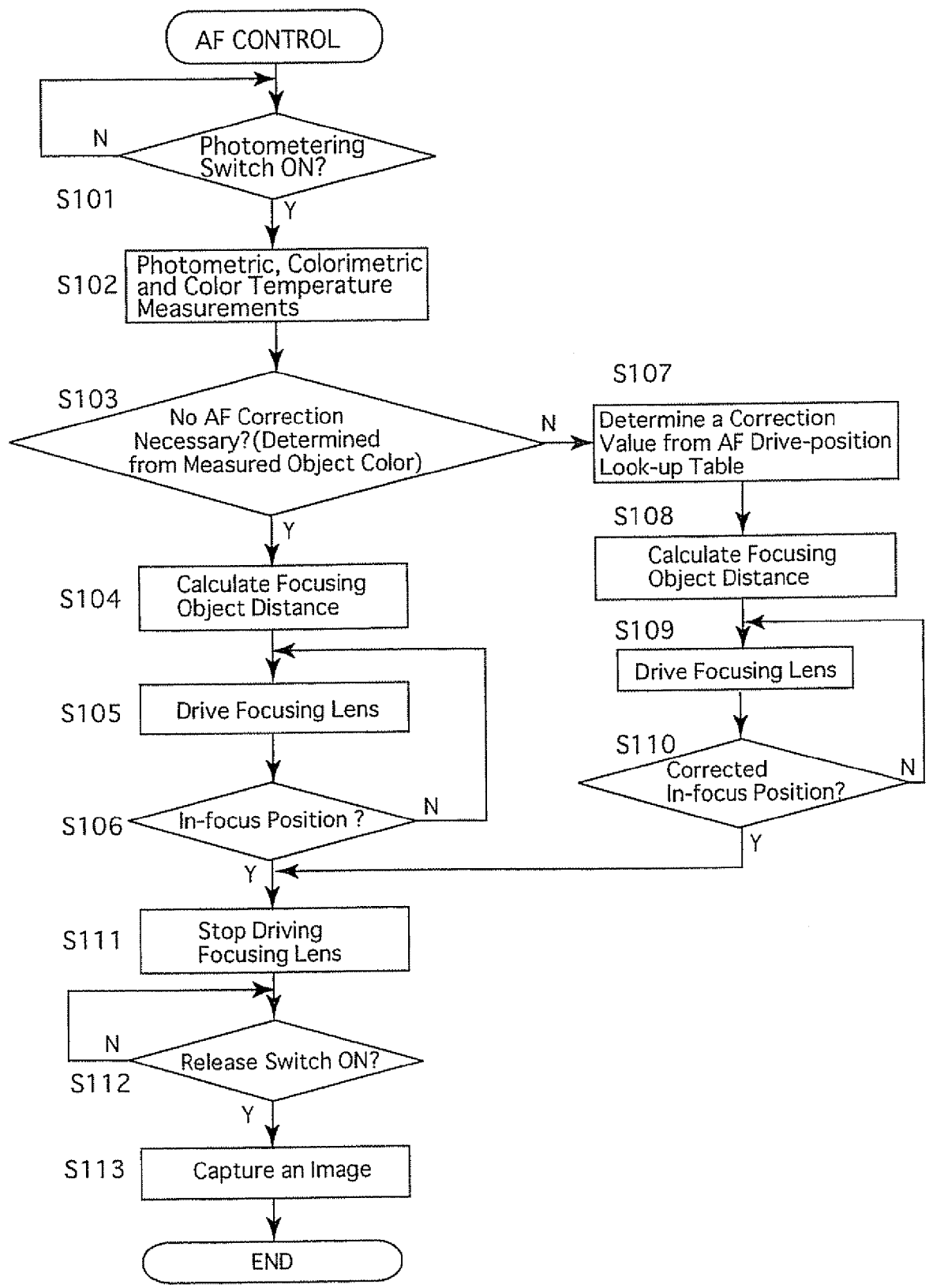
FIG. 6 is a flow chart showing an AF control process.

The AF control process performed at this stage by the CPU 10 will be hereinafter discussed with reference to the flow chart shown in FIG. 6. In the AF control process, firstly it is determined whether the photometering switch has been turned ON by a half depression of the release button 4 (step S101). Upon the release button 4 being depressed half way, the photometric sensor 16 carries out photometric measurements on the object while the calorimetric sensor 17 carries out calorimetric measurements on the aforementioned five points on the object which respectively correspond to the distance measuring points P1, P2, P3, P4 and P5 in the AF sensor unit 22, and color temperature measurements on the object using the red-light receptive area Tr, the green-light receptive area Tg and the blue-light receptive area Tb (step S102). Although the CPU 10 sets a shutter speed and an aperture value in accordance with photometric information on the object light, the description of this setting operation of the CPU 10 is omitted from the flow chart shown in FIG. 6. Upon the operation at step S102 being completed, it is determined from the measured object color by the CPU 10 whether no AF correction is necessary (step S103). At this stage, it is determined that no AF correction is necessary if the object color is green or closer to green, whereas it is determined that an AF correction is necessary if the object color is closer to blue or red. If it is determined that no AF correction is necessary (if YES at step S103), a focusing object distance is calculated based on distance measurement data obtained via the AF sensor unit 22 (step S104). Based on this calculated focusing object distance, the CPU 10 controls the operation of the AF driving mechanism 23 to move the focusing lens system of the photographing lens 8 to an in-focus position. In this control, this in-focus position of the focusing lens system of the photographing lens 8 is precisely set by driving the focusing lens system of the photographing lens via feedback control in which the position of the focusing lens system is repeatedly detected (steps S105 and S106).

On the other hand, if it is determined at step S103 that an AF correction is necessary (if NO at step S103), the CPU 10 reads a correction value corresponding to the measured object color from the AF-drive-position look-up table 30 (step S107). Subsequently, a focusing object distance is calculated based on distance measurement data obtained via the AF sensor unit 22, however, the CPU 10 makes a correction (AF correction) to the calculated focusing object distance in accordance with the correction value read from the AF-drive-position look-up table 30 (at step S108). Thereupon, based on this corrected focusing object distance, the CPU 10 controls the operation of the AF driving mechanism 23 by the aforementioned feedback control to move the focusing lens system of the photographing lens 8 to an in-focus position (steps S109 and S110). In this manner, the CPU 10 eliminates an AF error, which is caused by color difference in object light, from object colors measured at five points on an object which correspond to the distance measuring points P1, P2, P3, P4 and P5 in the AF sensor unit 22, respectively, which makes it possible to focus the photographing lens 8 on an object automatically with precision.

Upon moving to an in-focus position (if YES at step S106 or S110), the focusing lens system of the photographing lens 8 is stopped (step S111). Thereupon, control waits for the release button 4 to be fully depressed (step S112), i.e., it is determined whether the release switch of the release button 4 has been turned ON by a full depression of the release button 4 at step S112. If it is determined that the release switch of the release button 4 is ON (if YES at step S112), an image capturing process is performed to capture an object image, and thereafter control ends. In this image capturing process (the detailed description of which is not shown in the flow chart shown in FIG. 6), the swingable half mirror 11 is lifted up and the focal plane shutter 18 is opened so that an object image is formed on the CCD image sensor 20 via the photographing lens 8. An aperture value and a shutter speed at this time are set based on the aforementioned exposure information, which is calculated by the exposure controller 29 in accordance with a photometric value measured by the photometric sensor 16. At the same time, a charge accumulation time for the color CCD image sensor 20 is determined by the operation of the CCD driver 107. A color image signal is output from the CCD image sensor 20 and then this image signal is subjected to predetermined processings to be converted into a digital image signal as described above. In generating this digital image signal, the CPU 10 adjusts the white balance thereof in accordance with the measured object color temperature.

In this manner, the colorimetric sensor 17 is made to be capable of performing not only color measurements but also color temperature measurements in the above illustrated embodiment of the digital camera. In other words, the calorimetric sensor 17 is made as a colorimetric sensor which is integral with a color temperature sensor. Namely, the colorimetric sensor 17 serves as a dual-purpose sensor for color measurements and color temperature measurements. Therefore, even in the case where the digital camera needs to be provided with a calorimetric sensor, a color temperature sensor and a photometric sensor, the digital camera only needs to be provided with two sensors: a photometric sensor and a colorimetric sensor such as the colorimetric sensor 17, which simplifies the structure of the digital camera. Moreover, since the photometric sensor 16 is provided independently of the colorimetric sensor 17 in this case, influence on a photometering operation of the photometric sensor 16 which is caused by a color filter used in performing object color measurements can be eliminated, which makes both accurate photometric measurements and photographing with correct exposure possible. Furthermore, since the calorimetric sensor 17 can measure the object colors on five points on an object which respectively correspond to the distance measuring points P1, P2, P3, P4 and P5 and the color temperature of the object at the same time, a proper and high-precision AF control is achieved while an appropriate color temperature adjustment (white balance adjustment) can be made to a color image signal obtained by the imaging operation of the CCD image sensor 20.

The present invention has been described based on the above illustrated embodiment of the digital camera that uses an interchangeable lens because distance measurement data obtained via an AF sensor unit is easy to vary by exchanging the photographing lens mounted to the camera body, since, in the case of normal photographing lenses, individual color rendering properties often vary depending on the lens. The present invention is aimed at a digital camera in which such variation is compensated for. However, the technical idea of the present invention is not limited solely to a digital camera using an interchangeable lens. Namely, the present invention can be applied to any digital camera which includes a photometric sensor, a calorimetric sensor and a color temperature sensor as indispensable parts of the camera. Moreover, a colorimetric sensor provided in a digital camera to which the present invention is applied is not limited solely to a calorimetric sensor such as the colorimetric sensor 17 having the above described particular structure. Namely, the present invention is applicable as long as the color of at least a part of an object image and the color temperature of the whole object image can be measured by a single photoreceiver.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A digital camera comprising:
   an imaging device for capturing an image of an object;
   a signal processor which performs signal processing on a signal captured by said imaging device to obtain an image signal;
   a single measuring device for measuring color of at least a part of the object, and for measuring a color temperature of the object to adjust white balance of said image signal,
   an AF controller which measures an object distance of the object and performs AF control upon operation of a focusing lens system of a photographing lens to automatically bring the object into focus;
   a controller which makes an adjustment to said AF control based on the color of the object that is measured by said single measuring device; and
   a look-up table from which said controller obtains a correction value used for said adjustment to said AF control based on said color of at least a part of the object that is measured by said single measuring device.

2. The digital camera according to claim 1, further comprising a white balance adjustment device, wherein said white balance adjustment device adjusts a white balance of the image signal captured by said imaging device in accordance with the measured object color temperature of the object.

3. The digital camera according to claim 1, wherein said AF controller is configured to measure an object distance at least one predetermined point on the object, and
   wherein said single measuring device is configured so that a photoreceptive area thereof measures a color of the object at said predetermined point on the object.

4. The digital camera according to claim 1, wherein said single measuring device comprises:
   a photoreceptor, a light receptive surface of said photoreceptor being sectioned into a plurality of light receptive areas; and
   an optical plate positioned in front of said photoreceptor,
   wherein a portion of said plurality of light receptive areas is configured to measure said color of the object and the remaining portion of said plurality of light receptive areas is configured to measure said color temperature of the object,
   wherein a portion of said optical plate which corresponds to said portion of said plurality of light receptive areas is formed as a transparent portion which allows light of the object to pass therethrough, and
   wherein a portion of said optical plate which corresponds to said remaining portion of said plurality of light receptive areas is formed as a diffusing portion which diffuses light of the object which is incident thereon.

5. The digital camera according to claim 4, wherein said single measuring device comprises at least one color filter, positioned to cover said plurality of light receptive areas, for having each of said plurality of light receptive areas receive light of the object spectroscopically.

6. The digital camera according to claim 5, wherein each of a plurality of portions of said color filter which respectively correspond to said plurality of light receptive areas comprises at least one red-light filter portion, at least one green-light filter portion and at least one blue-light filter portion.

7. The digital camera according to claim 4, wherein said single measuring device is configured so that said portion of said light receptive area and said transparent portion are arranged to correspond to at least one specific point in said AF controller.

8. The digital camera according to claim 1, further comprising a photometer configured to obtain exposure settings for capturing images with said imaging device,
wherein said photometer is distinct from said single measuring device.

9. The digital camera according to claim 1, wherein said photographing lens comprises an interchangeable lens.

10. The digital camera according to claim 1, wherein said digital camera comprises an SLR digital camera having an image-erecting optical system, said single measuring device being positioned in a vicinity of an exit surface of said image-erecting optical system so that a portion of light which exits out of said exit surface is incident on said single measuring device.

11. The digital camera according to claim 1, wherein said AF controller comprises an AF sensor unit and an AF driving mechanism including a motor which drives said focusing lens system.

12. The digital camera according to claim 1, said single measuring device comprising a photoreceptor having a light receptive surface, at least one portion of said light receptive surface being configured to measure said color of the object and at least one remaining portion of said light receptive surface being configured to measure said color temperature of the object.

13. The digital camera according to claim 12, wherein said single measuring device is configured so that said at least one portion of the said light receptive surface is positioned so as to correspond to at least one specific distance measuring point of said AF controller.

14. The digital camera according to claim 12, wherein said single measuring device further includes an optical plate positioned in front of said photoreceptor, a portion of said optical plate corresponding to said at least one portion of said light receptive surface being transparent and a portion of said optical plate corresponding to said at least one remaining portion of said light receptive surface comprising a diffuser.

15. The digital camera according to claim 12, said single measuring device comprising at least one color filter, positioned on said at least one portion of said light receptive surface.

16. The digital camera according to claim 1, said single measuring device measuring color by measuring color intensities of red, green, and blue light.

17. The digital camera according to claim 1, said lookup table containing data on correlations between object colors and correction values for correcting distance measurement data obtained by said AF controller.

18. A digital camera including a photographing lens having a focusing lens system, the digital camera comprising:
an imaging device for capturing an image of an object and outputting a signal;
a signal processor configured to perform signal processing of the signal output by the imaging device;
a single measuring device configured to measure a color of at least a part of object, and to measure a color temperature of at least a different part of the object;
a controller configured to adjust white balance of the image signal based upon the measured color temperature of the object;
an AF controller configured to measure an object distance of the object and to perform AF control by operation of the focusing lens system of the photographing lens to automatically bring the object into focus; and
an adjuster configured to perform adjustment of the AF control based upon the measured color of the object.

* * * * *